Faris & Miller,
Grindstone.
No. 107,768.      Patented Sep. 27, 1870.
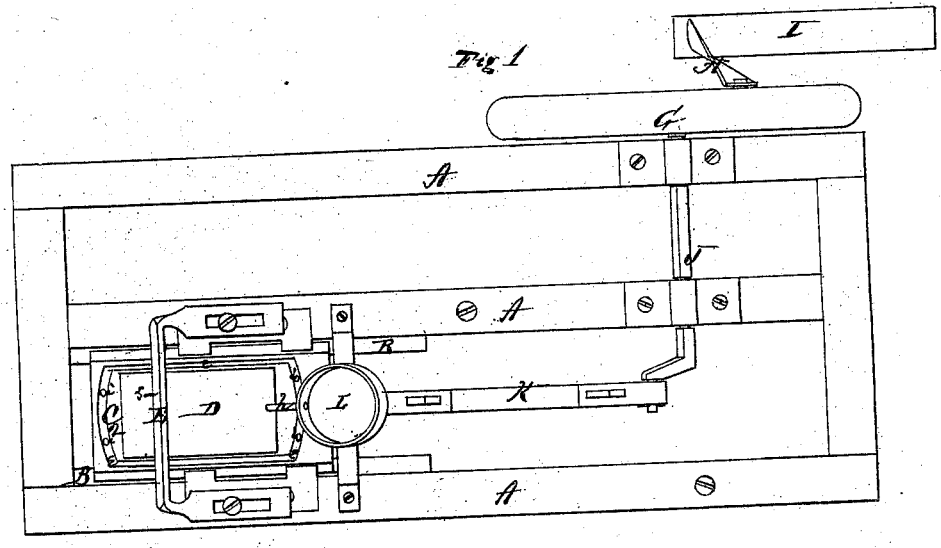
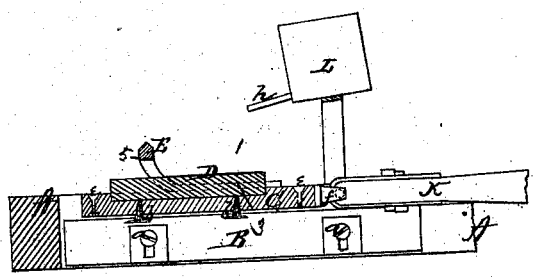
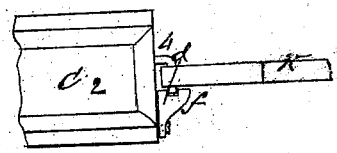
Witnesses:
Harry King
C. L. Evert
Inventors:
Uriah Faris
Abraham Miller
per
Alexander Mason
atty.

UNITED STATES PATENT OFFICE.

URIAH FARIS AND ABRAHAM MILLER, OF RED ROCK, IOWA.

IMPROVEMENT IN GRINDSTONES OR TOOL-SHARPENERS.

Specification forming part of Letters Patent No. 107,768, dated September 27, 1870.

*To all whom it may concern:*

Be it known that we, URIAH FARIS and ABRAHAM MILLER, of Red Rock, in the county of Marion, and in the State of Iowa, have invented certain new and useful Improvements in Grindstones or Tool-Sharpeners; and we do hereby declare that the following is a full, clear, and exact description thereof, reference being had to the accompanying drawings, and to the letters of reference marked thereon, making a part of this specification.

The nature of our invention consists in the construction and arrangement of a "machine for grinding and sharpening tools," as will be hereinafter fully set forth.

In order to enable others skilled in the art to which our invention appertains to make and use the same, we will now proceed to describe its construction and operation, referring to the annexed drawings, in which—

Figure 1 is a plan view of the entire machine. Fig. 2 is a longitudinal vertical section showing the stone and its carriage, with the adjustable guide upon which the carriage moves; and Fig. 3 is a bottom view of one end of the carriage, showing the manner in which the pitman is connected with the carriage.

A represents the frame of our machine, in which, at a suitable point, are two guides, B B, upon which the carriage C moves.

The guides B B are lined or shod with metal on their upper edges, where the carriage rests, and they are further made adjustable up and down, for the purpose of raising or lowering the carriage at will, by means of set-screws $a$ $a$, which pass through vertical slots in the guides, as shown in Fig. 2, and secure the guides to the frame.

In the upper side of the carriage C is a recess, in which the stone D is laid, said stone being raised and lowered at will by means of set-screws $b$ $b$, passing upward from the under side of the carriage and bearing against the under side of the stone.

Around the stone D in the upper surface of the carriage C is a groove, $e$, in which the oil or water from the stone collects and passes downward through the holes $i$ $i$ in the carriage.

Above the carriage on the frame A is secured an adjustable rest, E, for the purpose of placing the tool upon when sharpening.

The carriage is moved by means of a wheel, G, strap H, and treadle I, and upon the shaft J of the wheel G is a crank connected by pitman K with the carriage.

The connection between the carriage and pitman is formed by a hook, $d$, which is secured to the end of the carriage, and the pitman placed on the same and prevented from slipping off by means of a button, $f$, as shown in Fig. 3.

In order to change the stone, it is only necessary to turn the button $f$ and remove the pitman, when the carriage can be readily taken out and the change effected.

At a suitable point above the stone is placed a vessel, L, with tube $h$ to supply oil or water to the stone as needed.

The whole machine is to be placed upon the bench or at any convenient place for the operator.

Having thus fully described our invention, what we claim as new, and desire to secure by Letters Patent, is—

1. The carriage C, moving upon the adjustable guides B B, and provided with groove $e$ and holes $i$ $i$, substantially as and for the purposes herein set forth.

2. In combination with the carriage C, the stone D, resting in a recess upon said carriage, and adjusted by means of the set-screws $b$ $b$, substantially as and for the purposes herein set forth.

3. The arrangement of the hook or stirrup $d$ and button $f$, for connecting the carriage C and pitman K, substantially as shown and described.

4. The combination of the adjustable guides B B, carriage C, adjustable stone D, adjustable tool-rest E, and a mechanism for giving the carriage a reciprocating motion, substantially as and for the purposes herein set forth.

In testimony that we claim the foregoing we have hereunto set our hands this 27th day of June, 1870.

URIAH FARIS,
ABRAHAM MILLER.

Witnesses:
BENJAMIN F. POINTER,
JOSHUA ROUSH.